(12) United States Patent
Keller

(10) Patent No.: US 10,722,811 B2
(45) Date of Patent: Jul. 28, 2020

(54) METHOD FOR THERMAL SEPARATION OF NON-POLAR ORGANIC COMPOUNDS FROM A MATERIAL BY STEAM DISTILLATION

(71) Applicant: Norwegian Technology AS, Randaberg (NO)

(72) Inventor: Stig Ovar Keller, Hafrsfjord (NO)

(73) Assignee: Norwegian Technology AS, Randaberg (NO)

(*) Notice: Subject to any disclaimer, the term of this patent is extended or adjusted under 35 U.S.C. 154(b) by 0 days.

(21) Appl. No.: 15/770,231

(22) PCT Filed: Oct. 26, 2016

(86) PCT No.: PCT/NO2016/050211
§ 371 (c)(1),
(2) Date: Apr. 23, 2018

(87) PCT Pub. No.: WO2017/074197
PCT Pub. Date: May 4, 2017

(65) Prior Publication Data
US 2018/0304170 A1    Oct. 25, 2018

(30) Foreign Application Priority Data
Oct. 26, 2015    (NO) .................................... 20151452

(51) Int. Cl.
*B01D 3/38*    (2006.01)
*C10G 1/04*    (2006.01)
*E21B 21/06*    (2006.01)

(52) U.S. Cl.
CPC ............. *B01D 3/38* (2013.01); *C10G 1/047* (2013.01); *E21B 21/066* (2013.01)

(58) Field of Classification Search
CPC ........... B01D 3/34; E21B 21/066; C10G 1/04; C10G 1/047
See application file for complete search history.

(56) References Cited

U.S. PATENT DOCUMENTS

| | | | | |
|---|---|---|---|---|
| 4,670,634 A | * | 6/1987 | Bridges | B09C 1/005 166/248 |
| 6,184,427 B1 | * | 2/2001 | Klepfer | C10G 1/10 201/2.5 |
| 8,133,384 B2 | * | 3/2012 | Parsche | C10G 1/00 208/402 |
| 8,789,583 B2 | * | 7/2014 | Robinson | B09C 1/005 166/247 |
| 9,034,176 B2 | * | 5/2015 | Parsche | C10G 1/00 208/402 |
| 9,872,343 B2 | * | 1/2018 | Parsche | C10G 1/00 |
| 2004/0031731 A1 | * | 2/2004 | Honeycutt | C10G 1/00 208/402 |
| 2005/0145418 A1 | * | 7/2005 | Cordova | B01D 3/38 175/66 |
| 2007/0131591 A1 | * | 6/2007 | Pringle | A61B 18/1815 208/402 |
| 2010/0130387 A1 | * | 5/2010 | Davis | C10G 33/00 507/103 |
| 2010/0200300 A1 | * | 8/2010 | Robinson | B09C 1/005 175/66 |
| 2010/0219108 A1 | * | 9/2010 | Parsche | C10G 1/00 208/402 |
| 2011/0108466 A1 | | 5/2011 | Petcavich | |
| 2013/0334104 A1 | * | 12/2013 | Halas | B01D 3/02 208/348 |
| 2015/0258464 A1 | * | 9/2015 | Ramer | B01D 3/009 203/29 |

FOREIGN PATENT DOCUMENTS

| | | |
|---|---|---|
| CN | 103099309 | 5/2013 |
| EP | 1401550 | 11/2002 |
| EP | 2578285 | 4/2013 |
| WO | 2002/092187 | 11/2002 |

OTHER PUBLICATIONS

International Search Report, PCT/NO2016/050211, dated Jan. 19, 2017.
Written Opinion, PCT/NO2016/040211, dated Jan. 19, 2017.
Norwegian Search Report, Norwegian Patent Application No. 20151452, dated Apr. 26, 2016.
Norwegian Search Report, Norwegian Patent Application No. 20161693, dated May 12, 2017.
H. Shang et al., Microwave treatment of oil-contaminated North Sea drill cuttings in a high power multimode cavity, Separation and Purification Technology 49 (2006) 84-90, www.sciencedirect.com.

(Continued)

*Primary Examiner* — Jonathan Miller
(74) *Attorney, Agent, or Firm* — Andrus Intellectual Property Law, LLP

(57) ABSTRACT

A method is for thermal separation of a non-polar organic compound from a material by steam distillation, where microwave radiation provides energy to the material, and where a susceptor comprising an organic substance with an electric dipole characteristic is added to and mixed with the material prior to the steam distillation, and the susceptor contributes with vapor to the steam distillation. Use of the susceptor in a steam distillation process is described as well.

17 Claims, No Drawings

(56) References Cited

OTHER PUBLICATIONS

J. Reuss et al. Desorption by Microwaves; Mechanisms of Multicomponent Mixtures. Chem. Eng. Technol. 25(2002), 4, pp. 381-384.

Pereira Igor S.M. Microwave processing of oil contaminated drill cuttings, PhD thesis Sep. 2012, University of Nottingham, UK, 2013, Department of Chemical and Environmental Engineering.

Kowalski SJ and Mierzwa D. 2009. Convective drying in combination with microwave and IR drying for biological materials. Drying Technology, 27:1292-1301).

C. Yaws. 2007. "The Yaws Handbook of Vapor Pressure: Antoine Coefficients", 1st Edition. Gulf Publishing Company, pp. 76, 83, 85, 87, 89, 90, 92.

\* cited by examiner ature above 100° C., is added to the material prior to the
METHOD FOR THERMAL SEPARATION OF NON-POLAR ORGANIC COMPOUNDS FROM A MATERIAL BY STEAM DISTILLATION

CROSS-REFERENCE TO RELATED APPLICATIONS

This application is the U.S. national stage application of International Application PCT/NO2016/050211, filed Oct. 26, 2016, which international application was published on May 4, 2017, as International Publication WO 2017/074197 in the English language. The International Application claims priority of Norwegian Patent Application No. 20151452 filed Oct. 26, 2015. The international application and Norwegian application are both incorporated herein by reference, in entirety.

FIELD

There is provided a method for thermal separation of organic compounds from a material by steam distillation. More particularly the method concerns separation of non-polar organic compounds from the material. The non-polar organic compound may be a hydrocarbon. The material may be a material contaminated with an organic pollutant and the pollutant is removed by the method. The pollutant may be a hydrocarbon. Even more particularly the method concerns a thermal treatment/heat treatment of the material where an organic polar additive, that preferably has a boiling temperature above 100° C., is added to the material prior to the thermal treatment. An example of material is drill cuttings from the petroleum industry. The organic polar additive is a susceptor and at least a portion of the energy for the steam distillation is provided by radiation of the material with microwaves.

BACKGROUND

During drilling operations in connection with petroleum recovery, significant amounts of oil-based drilling mud are used. The drilling mud flows to surface entraining cuttings from the drilling operation in the borehole. A significant proportion of the drilling mud is immediately separated from the drill cuttings, whilst the drill cuttings with the remaining proportion of oil-based drilling mud is treated separately.

Relatively stringent statutory requirements prevent the drill cuttings from being discharged into the surroundings. It is known to reintroduce drill cuttings in a slurrified state into a borehole, but a significant proportion of the drill cuttings are shipped to treatment facilities for such cuttings.

According to prior art, the drill cuttings are cleaned further via centrifuging, washing by means of chemicals, or via thermal treatment. During thermal treatment water and organic material evaporates from the drill cuttings. The organic material may decompose if the temperature is too high. Decomposed organic material cannot be reused. Steam treatment is a more gentle thermal treatment that avoid decomposition of organic material including oils. Current statutory requirements require that the residual proportion of oil must be less than 10 g/kg of dry substance for allowing the cuttings to be disposed into the surroundings.

It is obvious, particularly when offshore drilling operations are involved, that transport and subsequent treatment of the drill cuttings are costly and environmentally dubious, insofar as transport and at least some of the known cleaning operations require significant amounts of energy.

It is known to heat drill cuttings directly and mechanically with a hammermill. The mechanical energy provided by the rotating hammers, heat the material. It is also known to heat drill cuttings indirectly in a rotary kiln where the material is exposed to a hot surface.

It is known to remedy polluted soils by heat treatment. This is commonly done in thermal desorption units comprising a heated flow through chamber with a conveying screw. The chamber wall may be heated or the conveying screw may be heated or both. The contaminated material is thereby exposed to at least one hot surface. Drill cuttings may also be cleaned by this method.

Many of these cleaning techniques rely on steam distillation. Water is added to the material if the material to be cleaned is too dry. As an example, experience has shown that the use of a hammermill will not work with dry material. Addition of water improves the process due to that the water contributes to the steam distillation. However, addition of water contributes to a less efficient process due to the heat capacity of water and to the relative high enthalpy of evaporation of water.

In addition to the effect of steam distillation, some compounds are also separated by entrainment. Entrainment is the effect of a fluid boiling inside the pores of the material creating small droplets of fluid in addition to the steam (shock poaching). The steam and small droplets are separated from the substrate.

It is known to use microwave ovens for heating of food items. Consumer microwave ovens usually operates at 2.45 GHz (12.2 cm wave length). Industrial and commercial microwave ovens operate at 915 MHz (32.8 cm wave length). Molecules that are electric dipoles, such as water, absorb electromagnetic energy from the microwaves. Such molecules rotate as they try to align themselves with the alternating electric field of the microwaves. A susceptor is a material that absorbs electromagnetic energy and convert the energy to heat.

Heating oil contaminated drill cuttings with microwave radiation has been performed for a numbers of years by different institutions. The University of Nottingham successfully built a drill cuttings treatment plant that utilizes a 100 kW magnetron supplying microwaves at 896 MHz. Nitrogen gas is used as sweep gas in order to increase the entrainment process. The pilot treatment plant manage to treat around 800 kg drill cuttings per hour while reducing the retained oil on cuttings (ROC) to below one percent. (Pereira IS. 2013. Microwave processing of oil contaminated drill cuttings. PhD thesis, University of Nottingham, UK). A commercial plant is provided by the company Rotawave Ltd. Shang et al. disclose use of microwaves for the treatment of oil-contaminated drill cuttings. Water/salt water was heated by exposure to microwaves and the rapid heating of the water provided the sensible and latent heats for vaporisation of the oil-based materials. The authors conclude that the concentration of the water within the samples appears to limit the possible maximum oil removal. Increased moisture content within the samples resulted in improved oil removal. The authors do not suggest other additives than water/salt water as susceptors. (Shang, H. et al. 2006. Microwave treatment of oil-contaminated North Sea drill cuttings in a high power multimode cavity. Separation and Purification Technology, 49:84-90.)

It is known to use heating by infrared radiation in addition to heating with microwaves. The purpose of the IR radiation is to further heat and separate oil from drill cuttings when all the water has evaporated. When all water on drill cuttings has been removed, microwave radiation has no heating effect in principle. This is valid if the oil or drill cuttings has no dipole moment, i.e. the material is transparent to microwaves. The IR radiation, which is in principle heat radiation at a certain frequency, would allow for heat generation and thus further evaporate oil from the drill cuttings. The combination of microwave radiation and IR radiation is a technology that has previously been utilized by other industries (Kowalski S. J., Mierzwa D. 2009. Convective drying in combination with microwave and IR drying for biological materials. Drying Technology, 27:1292-1301).

The principle of steam distillation applies for two immiscible fluids (e.g. water and oil) in accordance with Dalton's law. As a result, each fluid will start boiling at a reduced temperature and the vapour pressure of the two fluids will be shared.

Antoine's equation describes the relation between vapour pressure and temperature for pure compounds:

$$\log_{10} p = A - \frac{B}{C+T}$$

P is the vapour pressure, T is temperature (° C.) and A, B, and C are component specific constants. Values for a particular component may be found in C. Yaws. 2007. "The Yaws Handbook of Vapor Pressure: Antoine Coefficients", 1st Edition. Gulf Publishing Company.

Dalton's law represents the law of partial pressure. It states that in a mixture of non-reactive gases, the total pressure exerted is equal to the sum of partial pressures of the individual gases: $P_{total} = \Sigma_i \text{--} 1^n P_1$ or $P_{total} = P_1 + \ldots + P_n$ where $p_1, p_2, \ldots, p_n$ represent the partial pressure of each component.

The ideal gas law: PV=nRT, where P is the pressure of the gas, V is the volume of the gas, n is the amount of substance of the gas (number of moles), R is the universal gas constant, T is the temperature.

For a mixture of two gases:

$$\frac{P_{pol} V_{pol}}{P_{org} V_{org}} = \frac{n_{pol} R T_{pol}}{n_{org} R T_{org}} \qquad \text{(Eq. 1)}$$

where "pol" represents any polar compound and "org" represents any non-polar compound in vapour phase.

The gases occupy the same volume $V_{pol} w = V_{org}$. The temperature is also the same as the two compounds boil at the same temperature. Eq. 1 than simplifies to:

$$\frac{P_{pol}}{P_{org}} = \frac{n_{pol}}{n_{org}}. \qquad \text{(Eq. 2)}$$

The major advantage of having a high temperature is the increased partial pressure contribution from the oil on the cuttings. This will in practical terms mean that significantly less polar liquid is required to evaporate the oil from the cuttings.

It is well known in the art that fluids have different specific heat capacities and different enthalpy of vaporization. Examples are shown in Table 1.

TABLE 1

Comparison of different compounds with an electric dipole

| Compound | Specific heat capacity (J/kg · K) | Boiling point (° C.)* | Enthalpy of vaporization (kJ/kg) |
|---|---|---|---|
| Water | 4181.3 | 100 | 2257 |
| Ethylene glycol (MEG) | 2408.6 | 197.3 | 924 |
| Diethylene glycol (DEG) | 2306 | 245.8 | 628 |
| Triethylene glycol (TEG) | 2198 | 285 | 481 |
| Citric acid | 1179 | 310 | |
| Glycerol | 2409.6 | 290 | 996 |
| Propylene glycol (MPG) | 2510 | 188.2 | 880 |
| Dipropylene glycol (DPG) | 2180 | 230.5 | 338 |
| Tripropylene glycol (TPG) | 1970 | 265.1 | 184 |

*At 1 atmospheric pressure

SUMMARY

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

The invention increases the treatment capacity and energy efficiency of microwave radiation when applied as a heat source on oil contaminated drill cuttings. According to the invention water is replaced with environmental friendly polar organic compounds in a steam distillation process. Examples of such compounds are, but not limited to, ethylene glycol (MEG), diethylene glycol (DEG), triethylene glycol (TEG), glycerol, propylene glycol (MPG), dipropylene glycol (DPG), tripropylene glycol (TPG) and citric acid. The microwave radiation will generate a dipole moment in the polar organic compounds and trigger frictions between the molecules. Heat will be generated, and the steam distillation process will occur. As many polar organic compounds have a boiling point above 100° C. at 1 atmospheric pressure, the distillation process will occur at a higher temperature compared to a mixture of water and oil.

DETAILED DESCRIPTION

The polar organic compound with an electric dipole has advantageous a boiling point above 120° C. More advantageous the organic compound has a boiling point above 150° C. Even more advantageous the organic compound has a boiling point above 175° C. Even further more advantageous the organic compound has a boiling point above 190° C. It is advantageous to choose a polar organic compound that has a boiling point that is in the range of the boiling point of the compound or mixture of compounds that is to be removed from the contaminated material. The polar organic compound may have a boiling point that is higher than the boiling point of the compound or mixture of compound that is to be removed from the contaminated material.

It is general known that water has a high specific heat capacity. Small polar organic compounds by example MEG have a significantly lower heat capacity. Although the boiling temperature of MEG is 197.3° C. which is much higher than the boiling temperature of water, the energy required to bring MEG to its boiling temperature from ambient temperature (20° C.) is comparable to water. Water requires 334.5 kJ/kg while MEG requires 408 kJ/kg.

Enthalpy of vaporization is the energy required to transfer a liquid to its gas phase. Water has strong hydrogen bonding between the molecules and a high enthalpy of vaporization. MEG and TEG have significantly lower enthalpy of vaporization compared to water.

Combining the effect of increased process temperature achieved with a mixture of oil and polar solvents compared to a mixture of water and oil, with significantly lower specific heat capacity and significantly lower enthalpy of vaporization, the energy efficiency and treatment capacity in a microwave treatment plant may be significantly improved. Under ideal conditions were all the water is replaced with TEG, the energy consumption is approximately 5 times less based on the enthalpy of vaporization presented in Table 1. A further advantage is that due to the improved efficiency compared to water, there is required less TEG on a weight basis. This is due to the increased vapour pressure contribution from the oil as a result of the higher process temperature. As an example, assuming that only half of TEG is needed compared to water on a weight basis, the energy consumption drops to some ¹⁄₁₀ of the energy consumption. In practical terms some water will be present in the oil contaminated drill cuttings at the start of the heat treatment, but the numbers indicate the advantage of replacing water with a polar organic compound.

In addition to the organic compounds shown in Table 1, suitable polar organic compounds may be alcohols, such as 2-methyl-2,4-pentanediol and o-cresol; aldehydes, such as cinnamaldehyde; amides, such as acetamide, acetanilide and N-methylformamide; amines, such as histamine and ethanolamine; carboxylic acids, such as 2-ethylhexanoic acid and benzoic acid; ethers, such as anethone, polytetramethylene glycol, ethanoic anhydride and butyrolactone; esters, such as dibutyl maleate, diethyl maleate, diethyl malonate, ethyl dichloroacetate, methyl cyanoacetate and triacetin; ketones; and nitriles, such as succinonitrile and octanitrile. This is not an extensive list of possible polar organic additives that may be used according to the invention.

The choice of polar additive is based on among other things physical properties as specific heat capacity and boiling point. The choice is also based on price and availability of the additive. In addition the choice is based on work hazard and environmental considerations, and on the nature of the substance that is to be removed from the material to be cleaned.

Indirect or conventional heating is a method where the heat is generated externally and heat is transferred to the material through its surface. Heat transfer may be by conduction, convection or by infrared radiation. Direct heating is a method in which heat is generated within the product itself. Heat may be generated by a radio frequency technique, a microwave technique and friction on a powdery material such as in a hammermill.

In a first aspect the invention relates more particularly to a method for thermal separation of a non-polar organic compound from a material by steam distillation, where microwave radiation provides energy to the material, wherein a susceptor comprising an organic substance with an electric dipole characteristic is added to and mixed with the material prior to the steam distillation, and the susceptor contributes with vapour to the steam distillation.

The material may be a particular material. The non-polar organic compound may be a hydrocarbon. The non-polar organic compound may be an organic pollutant. The material may be contaminated with the organic pollutant.

Thermal separation may mean to make the material clean of the non-polar organic compound.

The vapour of the susceptor contributes to the steam distillation according to equation 2. The susceptor is added to and mixed with the material containing the non-polar organic compound prior to the steam distillation.

A susceptor is a material that absorbs electromagnetic energy and convert the energy to heat. The susceptor may have a boiling point of above 100° C. at atmospheric pressure. The susceptor may have a boiling point of above 120° C. at atmospheric pressure. The susceptor may have a boiling point of above 175° C. at atmospheric pressure. The susceptor may have a boiling point of above 190° C. at atmospheric pressure.

The steam distillation may be carried out at a temperature above 100° C. within the material and at an atmospheric pressure. The steam distillation may be carried out at a temperature above 115° C. within the material and at an atmospheric pressure. The steam distillation may be carried out at a temperature above 120° C. within the material and at an atmospheric pressure. The steam distillation may be carried out at a temperature above 150° C. within the material and at an atmospheric pressure. The steam distillation may be carried out at a temperature above 175° C. within the material and at an atmospheric pressure. The steam distillation may be carried out at a temperature above 190° C. within the material and at an atmospheric pressure.

In an embodiment where the steam distillation is carried out at a sub-atmospheric condition, steam distillation may be carried out at a temperature lower than the temperature at atmospheric conditions for the chosen susceptor. The actual temperature may be dependent on the actual sub-atmospheric pressure.

The susceptor may be an alcohol. The alcohol may be chosen from a group comprising monohydric alcohols, polyhydric alcohols, aliphatic alcohol and alicyclic alcohols. The alcohols may be ethylene glycol, diethylene glycol, triethylene glycol, propylene glycol, dipropylene glycol, tripropylene glycol or glycerol.

The susceptor may be an aldehyde, an amide, an amine, an ether, an ester, a ketone, a nitrile or an organic acid.

A gaseous phase released from the thermal treated material may be condensed and separated into a first fraction comprising the susceptor and a second fraction comprising a residue.

The contaminated material may comprise pre-treated drill cuttings. The second fraction may comprise a hydrocarbon. The second fraction may comprise oil. Pre-treated drill cuttings may have been treated mechanically and chemically to separate some of the water and oil from the material. Mechanical treatment may be by a centrifuge and chemical treatment may be by addition of surfactants.

The contaminated material may contain water prior to adding the susceptor to the contaminated material. The water may be inherent water in the material. The water may be added water to the material. A third fraction after condensation and separation of the gaseous phase may comprise water.

Recovered susceptor may be added back to the process by mixing with contaminated material. Recovered susceptor may also be used as a sweep gas in the microwave oven.

It is also described a method for thermal cleaning by steam distillation a material contaminated with an organic pollutant, where microwave radiation may provide energy to the material, wherein a susceptor comprising an organic substance with an electric dipole characteristic is added to and mixed with the material prior to the steam distillation. The susceptor may contribute with vapour to the steam distillation.

In a second aspect the invention relates more particularly to a use of an organic substance with an electric dipole characteristic as a susceptor to be mixed with a material containing a non-polar organic compound prior to steam distillation of the material with microwave radiation as an energy source.

The susceptor contributes with vapour to the steam distillation. The material may be a particular material. The non-polar organic compound may be a hydrocarbon. The non-polar organic compound may be an organic pollutant. The material may be contaminated with the organic pollutant.

The susceptor may be an alcohol. The alcohol may be chosen from a group comprising monohydric alcohols, polyhydric alcohols, aliphatic alcohol and alicyclic alcohols. The alcohols may be ethylene glycol, diethylene glycol, triethylene glycol, propylene glycol, dipropylene glycol, tripropylene glycol or glycerol.

The susceptor may be an aldehyde, an amide, an amine, an ether, an ester, a ketone, a nitrile or an organic acid.

A gaseous phase released from the thermal treated material may be condensed and separated into a first fraction comprising the susceptor and a second fraction comprising a residue.

The contaminated material may comprise pre-treated drill cuttings.

It is also described a use of an organic substance with an electric dipole characteristic as a susceptor to be mixed with a material contaminated with an organic pollutant prior to steam distillation of the material with microwave radiation as an energy source. The susceptor may contribute with vapour to the steam distillation.

It is also described a method for thermal separation of a non-polar organic compound from a material by steam distillation where energy is provided by direct heat treatment of the material, wherein an additive comprising a polar organic substance may be added to and mixed with the material prior to the steam distillation and the additive contributes with vapour to the steam distillation.

The material may be a particular material. The non-polar organic compound may be a hydrocarbon. The non-polar organic compound may be an organic pollutant. The material may be contaminated with the organic pollutant.

The vapour of the susceptor contributes to the steam distillation according to equation 2. The susceptor is added to and mixed with the material containing the non-polar organic compound prior to the steam distillation.

The process of steam distillation may be carried out in a hammermill.

The additive may be an alcohol. The alcohol may be chosen from a group comprising monohydric alcohols, polyhydric alcohols, aliphatic alcohol and alicyclic alcohols. The alcohols may be ethylene glycol, diethylene glycol, triethylene glycol, propylene glycol, dipropylene glycol, tripropylene glycol or glycerol.

The additive may be an aldehyde, an amide, an amine, an ether, an ester, a ketone, a nitrile or an organic acid. The additive may have a boiling point of above 100° C. at atmospheric pressure. The additive may have a boiling point of above 120° C. at atmospheric pressure. The additive may have a boiling point of above 175° C. at atmospheric pressure. The additive may have a boiling point of above 190° C. at atmospheric pressure.

A gaseous phase released from the thermal treated material may be condensed and separated into a first fraction comprising the additive and a second fraction comprising a residue.

The contaminated material may comprise pre-treated drill cuttings. The second fraction may comprise oil.

The contaminated material may contain inherent water prior to adding the additive to the contaminated material. Additional water may be added to the matter in addition to the additive. A third fraction may comprise water after condensation and separation of the gaseous phase.

Recovered additive may be added back to the process by mixing with contaminated material.

The thermal treatment may be a mechanical thermal treatment. The thermal treatment may be by contacting the material with a hot surface. A heat may be generated by electrical induction, an electrical heating coil, hot fluids and by open flame.

It is also described a use of an organic substance as an additive to be mixed with a material contaminated with an organic pollutant prior to steam distillation of the material, where direct heat treatment provides an energy source.

The additive may be an alcohol. The alcohol may be chosen from a group comprising monohydric alcohols, polyhydric alcohols, aliphatic alcohol and alicyclic alcohols. The alcohols may be ethylene glycol, diethylene glycol, triethylene glycol, propylene glycol, dipropylene glycol, tripropylene glycol or glycerol.

The additive may be an aldehyde, an amide, an amine, an ether, an ester, a ketone, a nitrile or an organic acid.

A gaseous phase released from the thermal treated material may be condensed and separated into a first fraction comprising the additive and a second fraction comprising a residue.

The contaminated material may comprise pre-treated drill cuttings.

EXAMPLES

A regular household microwave oven was used in all the examples. The oven had a nominal effect of 700 W.

The oil contaminated drill cuttings were clay based drill cuttings collected from a commercial drilling operation in the North Sea. A batch of drill cuttings was pre-treated in a lab swing-out centrifuge in order to separate as much oil and water from the drill cuttings as possible. The centrifuge was set at 3000 rpm (1740×g) for 6 min. After pre-treatment the cuttings were homogenized by mixing. Aliquots of the homogenized cuttings were used in the tests.

Test material was either placed on a glass plate or placed in a glass beaker and thereafter positioned in the microwave oven. The door to the oven was opened at intervals to measure the surface temperature of the drill cuttings and the glass plate if present. Surface temperature was measured by a hand held IR heat measuring device.

In the experiments where TEG was added to the drill cuttings, it was observed that smoke was released when opening the microwave door to perform a temperature measurement. This smoke was only present when the temperature of the drill cuttings was 180-190° C. After each experiment, the stove was cleaned for condensed oil and TEG. The condensate was present on the stove walls, roof and glass plate due to the colder surfaces. Condensate was in addition removed from the stove walls, roof and glass plate during the experiments if needed.

Experiment 1

The drill cuttings were heated in a retort at 480° C. to evaporate water and organic compounds. A retort analysis or retort test is a well established analysis in the petroleum industry. The dried clay was spread onto a glass plate and heated in the microwave oven.

TABLE 2

Results of heating dried clay

| | Temperature (° C.) | |
|---|---|---|
| Time (min) | Cuttings | Glass plate |
| Start | 24 | 24 |
| 1 | 61 | 59 |
| 2 | 81 | 76 |
| 3 | 97 | 119 |
| 4 | 115 | 136 |

Conclusion: Heating the dried clay with microwave radiation had a modest heating effect. As seen the glass plate became hotter than the clay. This indicates that the glass plate adsorbed most of the heat and transferred heat to the clay.

Experiment 2

Triethylene glycol (TEG) was added to an aliquot of homogenized dried drill cuttings from Experiment 1 in the ratio of 12 g TEG to 52 g dried drill cuttings. The mixture was placed in a glass beaker and heated in the microwave oven. The beaker was positioned on a glass plate.

TABLE 3

Results of heating a mixture of oil cuttings (52 g) and TEG (12 g)

| | Temperature (° C.) | |
|---|---|---|
| Time (min) | Cuttings | Glass plate |
| Start | 25 | 245 |
| 0.5 | 125 | 34 |
| 1.0 | 191 | 45 |
| 1.5 | 193 | 51 |
| 2.0 | 240 | 67 |
| 3.0 | 267 | 114 |

It was observed that after 1 minute the TEG started to evaporate and form a white smoke. At termination of the experiment some areas of the drill cuttings still contained TEG. This was seen as darker areas in the light grey dry oil cuttings. This was due to imperfect distribution of microwaves inside the stove.

Conclusion: Addition of TEG to the drill cuttings had a significant effect on the heating of the drill cuttings due to the adsorption of microwave energy by the TEG. The temperature rise of the glass plate was comparable to Experiment 1. It is necessary to stir the drill cuttings during the drying process.

Experiment 3

Triethylene glycol (TEG) was added to an aliquot of homogenized drill cuttings containing 12.5% oil and 8.3% water, in the ratio of 21 g TEG to 150 g drill cuttings. The mixture was distributed over a glass plate and heated in the microwave oven for 8 minutes. The drill cuttings were heated to approximately 200° C. A sample of the treated drill cuttings was collected for retort analysis.

TABLE 4

Results of heating a mixture of oil cuttings (150 g) and TEG (21 g)

| | Temperature (° C.) | |
|---|---|---|
| Time (min) | Cuttings | Glass plate |
| Start | 25 | 25 |
| 1 | 66 | 28 |
| 2 | 84 | 34 |
| 3 | 117 | 42 |
| 4 | 136 | 54 |
| 5 | 129 | 79 |
| (Mixing*) | 133 | 67 |
| 7 | 132 | 91 |
| 8 | 199 | 77 |

*Temperatures are measured after mixing the drill cuttings on the glass plate with a metal spatula It was observed that some areas of the drill cuttings still contained TEG. This was seen as darker areas in the light grey dry oil cuttings. This was due to imperfect stirring during the drying process. It was also observed that the process temperature did increase after the water was evaporated after approximately 7 minutes.

Conclusion: Addition of TEG to the drill cuttings had a significant effect on the heating of the drill cuttings. The temperature rise of the glass plate was comparable to Experinvent 1.

Experiment 4

Triethylene glycol (TEG) was added to an aliquot of homogenized drill cuttings containing 12.5% oil and 8.3% water, in the ratio of 42 g TEG to 150 g drill cuttings. The mixture was placed in a glass beaker and heated in the microwave oven for approximately 12 minutes. Due to insufficient penetration of microwaves with depth, the drill cuttings were manually mixed with a spatula approximately every 4 minutes. Temperature of the oil cuttings were registered prior to and after mixing. A sample of the treated drill cuttings was collected for retort analysis.

TABLE 5

Results of heating a mixture of oil cuttings (150 g) and TEG (42 g)

| | Temperature (° C.) | |
|---|---|---|
| Time (min) | Before mixing | After mixing |
| Start | 25 | na |
| 1 | 114 | na |
| 2 | 140 | 100 |
| 3 | 143 | Na |
| 4 | 164 | 129 |
| 5 | 170 | na |
| 6.5 | 226 | 204 |
| 8.5 | 245 | 220 |
| 9 | 237 | na |
| 10 | 242 | na |
| 11 | 236 | na | na: not applicable

It was observed that the process temperature did increase after the water was evaporated after approximately 5 minutes. There was a higher degree of separation achieved with the use of TEG as a susceptor to impose steam distillation at higher process temperatures.

Experiment 5

Triethylene glycol (TEG) was added to an aliquot of homogenized drill cuttings containing 12.5% oil and 8.3% water, in the ratio of 21 g TEG to 150 g drill cuttings. The mixture was placed in a glass beaker and heated in the microwave oven. An additional amount consisting of 33 g of TEG was added after most of the initial amount of TEG had evaporated. A sample of the treated drill cuttings was collected for retort analysis.

TABLE 6

Results of heating a mixture of oil cuttings (150 g) and TEG (21 g + 33 g)

| Time (min) | Temperature (° C.) | |
|---|---|---|
| | Before mixing | After mixing |
| Start | 24 | na |
| 2 | 108 | 100 |
| 3 | 110 | na |
| 4 | 139 | 116 |
| 5 | 147* | 86 |
| 6 | 204 | 105 |
| 7 | 220 | 178 |
| 8 | 220 | na |
| 9 | 238 | 153 |
| 10 | 226 | na |
| 11 | 231 | na |
| 12 | 228 | na |

*After 5 minutes it was assumed that the water and some oil had evaporated, the weight of the cuttings was 130.6 g before and 163.2 g after adding more TEG It was observed that after the water was separated, the temperature increased. The oil and TEG evaporated and formed a thick layer of smoke in the stove. The smoke was ventilated during mixing in addition to that TEG and oil condensed on the inside of the microwave oven.

Conclusion: Addition of TEG to the drill cuttings allowed for a higher process temperature which gave a better degree of separation. Increased process temperature correlates to the theory of Dalton and to Antoin's equation which will result in higher mole-fraction of oil evaporated with less use of TEG compared to water. This is a result of the increased vapour pressure contribution from the oil retained on the cuttings.

Experiment 6

Water was added to an aliquot of homogenized drill cuttings containing 12.5% oil and 8.3% water, in the ratio of 40 ml water to 150 g drill cuttings. The mixture was placed in a glass beaker and heated in the microwave oven. The beaker was mixed by hand with a spatula every 2 minute and the temperature was registered. A sample of the treated drill cuttings was collected for retort analysis.

TABLE 7

Results of heating a mixture of oil cuttings (150 g) and water (40 ml)

| Time (min) | Temperature (° C.) | |
|---|---|---|
| | Before mixing | After mixing |
| Start | 24 | na |
| 1 | 68 | na |
| 2 | 100 | 98 |
| 4 | 100 | 97 |
| 6 | 108 | 98 |
| 8 | 143 | na |

It was observed that the drill cuttings appeared free of water.

Conclusion: Addition of water resulted in a process temperature in the range of the boiling temperature of water. As water evaporated, the process temperature increased. However, the energy efficiency of the energy transfer is considered to be low as the temperature did increase significantly slower than when TEG was used as a susceptor.

TABLE 8

Results of retort analysis

| | Drill cuttings[a] | Exp. 3 | Exp. 4 | Exp. 5 | Exp. 6 |
|---|---|---|---|---|---|
| Wet drill cuttings (g) | 90 | 40.8 | 59 | 57.3 | 52.4 |
| Dry solid (g) | 62.8 | 38.2 | 56.7 | 55.8 | 49.7 |
| Oil (ml) | 10 | 1.6 | 0.5 | 0.2 | 2.8 |
| Water/triethylene glycol (ml) | 18.5 | 0 | 0.4 | 0.2 | 1.2 |
| Solid volume (%) | 61.5 | 96.8 | 98.2 | 99.2 | 92 |
| Oil volume (%) | 20 | 3.2 | 1 | 0.4 | 5.6 |
| Water/TEG volume (%) | 18.5 | 0 | 0.8 | 0.4 | 2.4 |
| Oil on wet drill cuttings (g/kg) | 8.3 | 3.4 | 0.93 | 0.28 | 4.0 |
| Oil on dry drill cuttings (g/kg) | 12.2 | 3.8 | 0.97 | 0.29 | 4.2 |

[a]Drill cuttings prior to heat treatment

Experiment 6

Steam distillation with polar organic chemicals Sipdrill is a commercial available oil used in drilling fluid. Clairsol is another oil. Sipdrill has a boiling point between 210 and 260° C. and contains aliphatic hydrocarbons (C10-C13).

Clairsol has a boiling point between 230 and 335° C. and contains according to the provided material safety data sheet approximately 98% n-alkanes, iso-alkanes and cyclic alkanes (C14-C18).

Literature values for the vapour pressure at different temperatures for the two oils were not available. For the purpose of estimating the expected vapour pressure of Sipdrill and Clarisol versus temperature, tridecane ($C_{13}H_{28}$) and hexadecane ($C_{16}H_{34}$) were chosen as substitutes for Sipdrill and Clairsol, respectively. Tridecane has a boiling point in the range of 232-236° C., which is approximately in the middle of the range of Sipdrill. The same argument applies to hexadecane which has a boiling point of 287° C.

Based on Antoine's equation the temperature versus the compound's individual vapour pressure can be determined.

TABLE 9

Vapour pressure and distillation ratio when distilling with water

| | Theoretical boiling point with water | Vapour pressure (mmHg) | | Distillation ratio |
|---|---|---|---|---|
| Distilled oil | (° C.) | Oil | Water | (oil:water) |
| Tridecane | 100 | 7.3 | 758 | 1:9 |
| Hexadecane | 100 | 0.57 | 758 | 1:90 |

TABLE 10

Vapour pressure and distillation ratio when distilling with glycerol

| Distilled oil | Theoretical boiling point with glycerol (° C.) | Vapour pressure (mmHg) | | Distillation ratio (oil:glycerol) |
| --- | --- | --- | --- | --- |
| | | Oil | Glycerol | |
| Tridecane | 228 | 636 | 125 | 17:1 |
| Hexadecane | 265 | 457 | 300 | 6:1 |

A standard laboratory distillation apparatus set up was used for the experiment. The boiling flask was a 500 ml glass flask and the receiving flask was a 100 ml round bottom glass flask. An aluminium sheet covered the heating mantle and the boiling flask to avoid fractional distillation. After completed distillation, the collected distillate was transferred to a graded glass tube for reading of the volumes.

TABLE 11

Result from the steam distillation experiment

| Polar organic compound | Oil | Estimated boiling temperature (° C.) | Oil:polar organic compound evaporation ratio |
| --- | --- | --- | --- |
| Glycerol (20 ml) | Sipdrill (10 ml) | 225-230 | 10:1 |
| Glycerol (20 ml) | Clairsol (10 ml) | 258-267 | 10:1.5 |

The results presented in Table 11 are conservative. A maximum amount of 1 and 1.5 ml glycerol is required to evaporate 10 ml of Sipdrill and Clairsol, respectively. There was a surplus of glycerol and some glycerol was evaporated and collected after all the oil was evaporated from the boiling flask.

Compared to the theoretical calculations presented in table 10, the observed ratio of Clairsol:glycerol of 10:1.5 corresponds well with the calculated ratio of 6:1. The observed ratio of Sipdrill:glycerol of 10:1 deviates somewhat from the calculated value of 17:1. This is at least partly due to the positive capillary force between the glycerol and the glass wall and the negative capillary force between the Sipdrill and the glass wall, which made precise readings difficult. In addition a surplus of glycerol was distilled after the oil was separated as explained above.

In conclusion, the use of calculated values for tridecane and hexadecane was representative for experimental achieved values for Sipdrill and Clairsol, respectively.

It should be noted that in this experiment glycerol has a boiling point of 290° C. which is above the boiling point of Sipdrill and above some of the fractions of Clairsol.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A method for thermal separation of a non-polar organic compound from a particulate material, the method comprising:
   providing the particulate material, wherein the particulate material is either 1) contaminated by an organic pollutant or 2) includes pre-treated drill cuttings, wherein the pre-treated drill cuttings comprise the non-polar organic compound; said pre-treated drill cuttings being cuttings from a drilling operation in a borehole, and separated from a drilling mud, and cleaned mechanically or chemically to separate some water and oil from the drill cuttings;
   adding a susceptor to the particulate material, the susceptor consisting of a polar organic substance with an electric dipole characteristic; and
   separating the non-polar organic component from the particulate material in a gaseous phase using a steam distillation process, where microwave radiation provides energy to the polar organic susceptor, and wherein the polar organic susceptor contributes with vapor to the steam distillation process.

2. The method according to claim 1, wherein the steam distillation process is carried out at a temperature above 100° C. within the material and at an ambient pressure.

3. The method according to claim 1, wherein the polar organic susceptor is an alcohol.

4. The method according to claim 3, wherein the alcohol is selected from the group consisting of: monohydric alcohols, polyhydric alcohols, aliphatic alcohols and alicyclic alcohols.

5. The method according to claim 1, wherein the polar organic susceptor is an amine.

6. The method according to claim 1, wherein the polar organic susceptor is an ether.

7. The according to claim 1, wherein the polar organic susceptor is an ester.

8. The method according to claim 1, wherein the polar organic susceptor is a nitrile.

9. The method according to claim 1, wherein the particulate material contaminated by an organic pollutant further comprises water.

10. The method according to claim 1, wherein a plurality of gaseous phases released from the thermal treated material are condensed and separated into a first fraction comprising the susceptor and a second fraction comprising a residue.

11. The method according to claim 10, wherein the second fraction comprises oil.

12. A method for thermal separation of a non-polar organic compound from a particulate material, the method comprising:
   mixing a susceptor with the particulate material, the susceptor comprising a polar organic liquid with an electric dipole characteristic; and
   separating the non-polar organic compound from the particulate material in a gaseous phase using a steam distillation process, wherein the steam distillation process comprises providing energy to the susceptor using microwave radiation.

13. The method according to claim 12, wherein the method further comprises:
   condensing a gaseous phase released from the thermal treated material; and
   separating the condensed material into a first fraction comprising the susceptor and a second fraction comprising a residue.

14. The method according to claim 12, wherein the susceptor is an alcohol.

15. The method according to claim 14, wherein the alcohol is selected from the group consisting of: monohydric alcohols, polyhydric alcohols, aliphatic alcohols and alicyclic alcohols.

16. The method according to claim 12, wherein the particulate material is contaminated by an organic pollutant.

17. The method according to claim 12, wherein the particulate material comprises drill cuttings.

* * * * *